United States Patent Office 3,442,284
Patented May 6, 1969

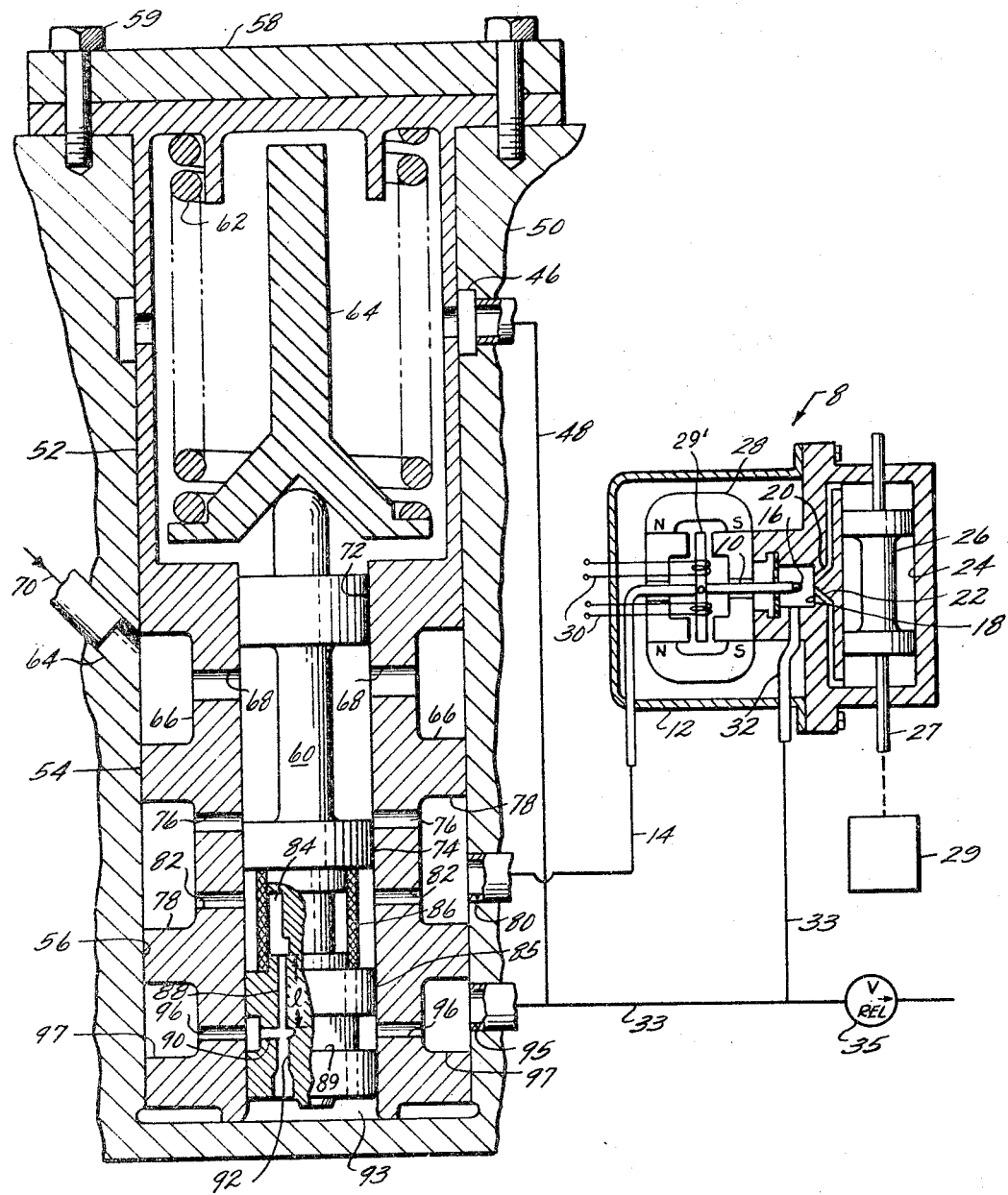

3,442,284
VISCOSITY COMPENSATED FLOW REGULATING DEVICE
James E. Hurtle, Cincinnati, and Howard B. Kast, Fairfield, Ohio, assignors to General Electric Company, a corporation of New York
Filed May 27, 1966, Ser. No. 553,545
Int. Cl. G05d 1/00
U.S. Cl. 137—110                              7 Claims

ABSTRACT OF THE DISCLOSURE

A device is provided for compensating viscosity changes in a jet tube servo valve. The pressure of the control liquid supplied to the jet tube of the servo valve is varied as a function of liquid viscosity to maintain a constant velocity of the control liquid discharged therefrom. By having a constant velocity discharge of the control liquid, the rates of change of the servo valve are unaffected by temperature or other conditions which would affect viscosity. Changes in the liquid supply pressure are obtained by variably throttling the supply liquid with a movable spool piston, the position of which is determined by the pressure drop across a second reference nozzle.

---

The invention described and claimed in the United States patent application herein resulted from work done under United States Government contract FA-SS-64-1. The United States Government has an irrevocable, non-exclusive license under said application to practice and have practiced the invention claimed herein, including the unlimited right to sublicense others to practice and have practiced the claimed invention for any purpose whatsoever.

The present invention relates to liquid flow control devices and more specifically to viscosity compensated flow control devices for use with a control device.

It is common practice to utilize a high velocity liquid jet in control systems. An example of such a use is where a liquid jet is discharged from a deflectable tube having a relatively small area orifice into a pair of receiver passages which transmit the pressure of the jet to opposite ends of a translatable valve. When the tube is deflected, a differential pressure is exerted on the valve, thus urging it into motion. The valve displacement may be various predetermined functions of the tube deflection depending upon the particular physical arrangement of the components.

In order for the tube and the valve to function with a constant predetermined relationship, the velocity of the liquid jet must remain constant. This result may be difficult to achieve when the control system is operated in an environment having substantial temperature changes such as in a gas turbine aircraft engine. When an engine is started, the liquid is at ambient temperature, at which time it has a relatively high viscosity. Because of the small area through which the liquid discharges, the velocity of the jet is substantially lowered. As the engine temperatures reach an operating level, the viscosity of the liquid decreases which increases the velocity of the jet.

This variation in the liquid jet velocity results in unwanted changes in the functional relationship between the displacement of the valve and the deflection of the tube, thereby impairing their control characteristics.

Accordingly, it is an object of the present invention to maintain a liquid jet discharged from a nozzle at a constant level when the viscosity of the liquid changes and to do so in a simplified economical fashion.

The above ends are achieved by providing a viscosity compensated flow control device which comprises first and second nozzles from which liquid jets are to be discharged, the first nozzle producing a control function output. Means are provided for controlling the pressure drop across the nozzles. Means responsive to the velocity pressure head of the jet issuing from the second nozzle are provided for varying the pressure differential controlling means to maintain the velocity of the liquid jet discharged from the first nozzle at a constant level. The velocity of the jet discharged from the first nozzle then remains constant when the viscosity of the liquid varies.

The above and other related objects and features of the invention will be apparent from a reading of the following description of the disclosure found in the accompanying drawing and the novelty thereof pointed out in the appended claims.

In the drawing:
The figure is a longitudinal section of a flow control device embodying the present invention with the cooperating elements of a control system shown in simplified fashion.

Referring now to the figure, a control system environment for the present invention is illustrated. A jet tube servo valve 8 comprises a flexible tube 10 mounted in a housing 12. The tube 10 receives pressurized liquid from a conduit 14 for discharge through a relatively small area nozzle 16 into a chamber 18. The chamber 18 has an outlet 32 connected to a low pressure discharge conduit 33. The conduit 33 has a pressure regulating valve 35 for maintaining the pressure in chamber 18 at a relatively low pressure. The resultant pressure drop across the nozzle 16 of the tube 10 causes a discharge of a high velocity jet of liquid into the chamber 18. A pair of receiver passages 20, 22 are disposed to accept an equal amount of the high velocity liquid jet when the tube 10 is in its illustrated neutral position. The receiver passages 20, 22 connect with opposite ends of a bore 24 in which a piston 26 is slidably mounted. Means are provided to deflect the tube 10 and are herein shown as a torque motor 28, responsive to electrical signals through lines 30. An armature 29' of the torque motor 28 is secured to the tube 10 and exerts a twisting moment thereon when differential current is applied to the lines 30. The flexible tube 10 exerts a resisting moment which causes its displacement to be directly proportional to the magnitude of the differential current.

In operation, the jet tube 10, when in the neutral position, directs the high velocity liquid jet at both receiver passages 20, 22 so that the pressures on opposite ends of the piston 26 are equal. The distance between the orifice 16 and the receiver passages 20, 22 is such that substantially all of the kinetic energy of the jet is converted to pressure in the passages. When the passages 20, 22 are full, the excess liquid flows through the outlet 32 to the conduit 33 where the pressure regulating valve 35 passes liquid to a suitable discharge to maintain the relatively low pressure in chamber 18.

When a differential current is applied to the torque motor 28, the tube 10 is deflected an amount directly proportional to the magnitude of the current differential. The high velocity jet from the tube 10 then impinges to a greater extent on one of the receiver passages to increase the pressure on one end of the piston 26 and urge it into motion. When the flow issuing from the tube 10 is constant, the resultant flow through the receiver passages 20, 22, and hence the velocity of the piston 26, are directly proportional in magnitude and direction to the deflection of tube 10 from its neutral position.

Thus it can be seen that the tube 10 and piston 26 act as an integrator with the piston 26 displacement being the time integral of the deflection of the tube 10. Such a function has particular application in many control sys-

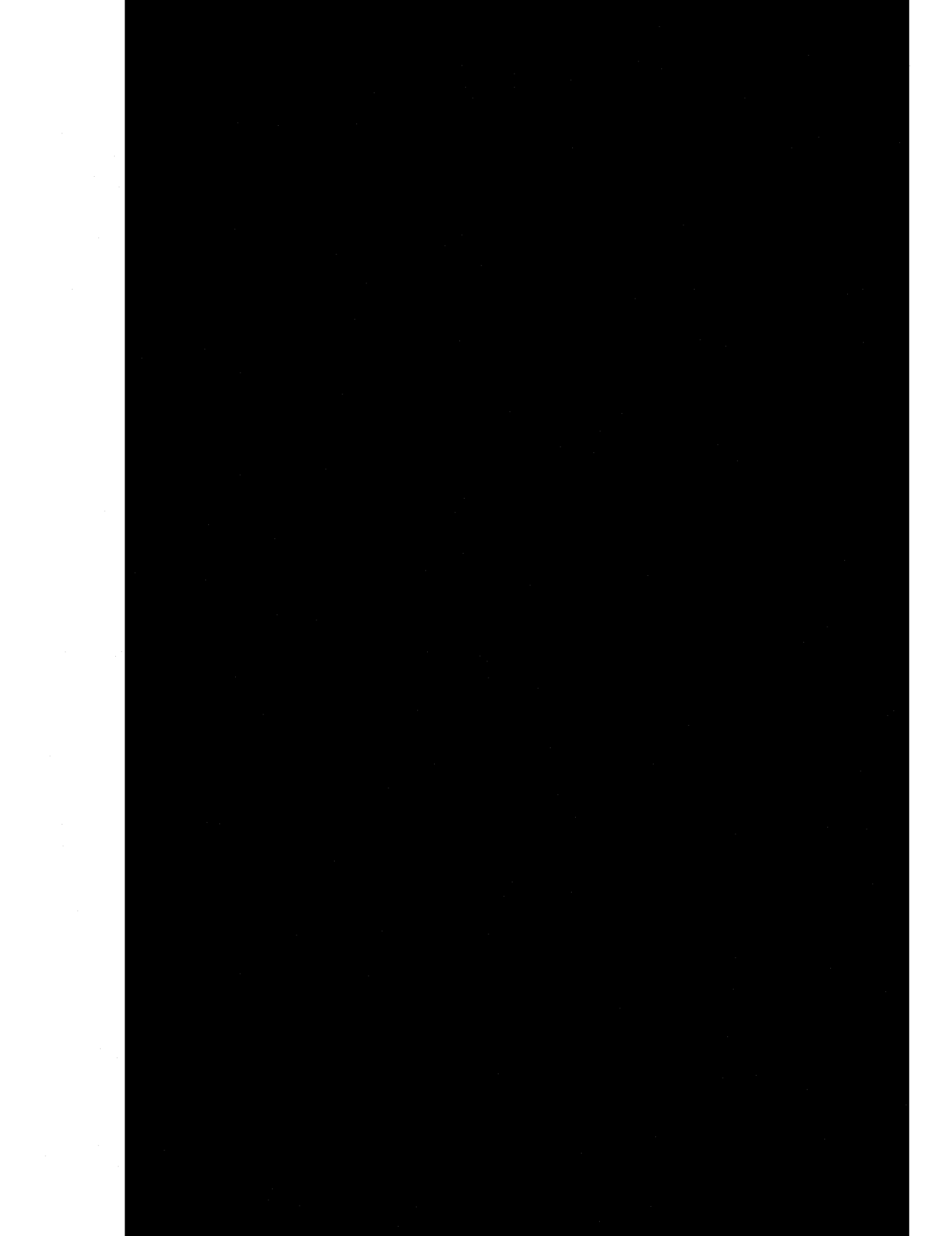

said first nozzle has a flow path therethrough with a relatively small exit area, said second nozzle has a flow path therethrough with a relatively small area and a length such that a change in velocity of the jet discharged from said second nozzle in response to a change in viscosity of said liquid is substantially that of said first nozzle.

3. A viscosity compensated liquid flow control device as in claim 1 wherein said means for controlling the pressure drop across said nozzles comprises, throttling means disposed upstream of said nozzles.

4. A viscosity compensated flow control device as in claim 3 wherein said throttling means comprises, a housing having inlet and outlet pasageways, a valve slidable in said housing and cooperating with said outlet passageway to provide a throttling of the liquid flow through said housing.

5. A viscosity compensated flow control device as in claim 4 further comprising, a chamber through which the liquid jet from said second nozzle is discharged, and said means for varying said pressure differential controlling means comprises, yieldable means for urging said valve towards an unthrottled position, passageway means receiving the liquid jet discharged from said second nozzle for transmitting the total pressure head thereof to said valve such that said pressure acts to urge said valve towards a throttled position, second passageway means for transmitting the static pressure of the liquid discharged through said chamber to said valve such that the static pressure acts to oppose the action of said total pressure head, whereby the resultant force on said piston opposing said yieldable urging means is the velocity pressure head of the liquid jet discharged from said second nozzle.

6. A viscosity compensated flow control device as in claim 5 wherein, said second nozzle comprises, a first recess in said valve, a flow path from the outlet passageway of said housing to said groove, a passageway extending from said groove, said chamber comprises, a second recess in said valve receiving the discharge from said passageway, said passageway means for transmitting the static pressure of said liquid jet comprises, means providing a flow path from said second recess to the end of said valve on which said yieldable urging means acts.

7. A viscosity compensated flow control device as in claim 5, further comprising, a chamber through which the liquid jet from said first nozzle is discharged, means for interconnecting said first nozzle chamber and said second nozzle chamber, whereby the pressure drop across said nozzles is substantially equal.

References Cited

UNITED STATES PATENTS

| | | | |
|---|---|---|---|
| 2,590,111 | 3/1952 | MacCracken et al. | 239—75 |
| 3,170,503 | 2/1965 | Isley et al. | 158—36 |
| 3,282,323 | 11/1966 | Katz et al. | 239—75 |

M. CARY NELSON, *Primary Examiner.*

R. J. MILLER, *Assistant Examiner.*

U.S. Cl. X.R.

137—83